United States Patent
Frattini

(10) Patent No.: US 8,066,115 B2
(45) Date of Patent: Nov. 29, 2011

(54) APPARATUS FOR WORKING ON METAL CONTAINERS

(75) Inventor: Roberto Frattini, Ponteranica (IT)

(73) Assignee: Frattini S.p.A. Costruzioni Meccaniche, Seriate (IT)

(*) Notice: Subject to any disclaimer, the term of this patent is extended or adjusted under 35 U.S.C. 154(b) by 0 days.

(21) Appl. No.: 12/734,347

(22) PCT Filed: Oct. 25, 2007

(86) PCT No.: PCT/IT2007/000746
§ 371 (c)(1),
(2), (4) Date: Apr. 26, 2010

(87) PCT Pub. No.: WO2009/054012
PCT Pub. Date: Apr. 30, 2009

(65) Prior Publication Data
US 2010/0252396 A1    Oct. 7, 2010

(51) Int. Cl.
B65G 47/84    (2006.01)
(52) U.S. Cl. .............................. 198/803.15; 198/803.14
(58) Field of Classification Search ............. 198/867.11, 198/867.12, 803.14, 803.15, 850, 851
See application file for complete search history.

(56) References Cited

U.S. PATENT DOCUMENTS

| | | | | |
|---|---|---|---|---|
| 3,342,304 A * | 9/1967 | Greulich | ................. | 198/803.14 |
| 3,348,658 A * | 10/1967 | Cannon | .................... | 198/803.15 |
| 3,576,247 A * | 4/1971 | Caulford et al. | ........ | 198/803.14 |
| 4,034,692 A | 7/1977 | Hennes | | |
| 4,263,837 A * | 4/1981 | Tassie | ...................... | 198/803.14 |
| 5,799,779 A * | 9/1998 | Konitzer et al. | ......... | 198/803.15 |
| 7,473,092 B2 * | 1/2009 | Pan | ............................. | 198/850 |

FOREIGN PATENT DOCUMENTS

| | | |
|---|---|---|
| JP | 02 169137 A | 6/1990 |
| JP | 09 136051 A | 5/1997 |
| WO | WO 2006/095215 A | 9/2006 |

OTHER PUBLICATIONS

International Search Report, Aug. 29, 2008.

* cited by examiner

*Primary Examiner* — James R Bidwell
(74) *Attorney, Agent, or Firm* — Bucknam & Archer

(57) ABSTRACT

An apparatus (10) for working on metal containers, especially suitable for high speed machines and intended for performing a sequence of operations on the metal containers themselves including a chain composed of a plurality of elements (12) linked in a succession and cooperating in simultaneous transporting and processing of metal containers.

11 Claims, 3 Drawing Sheets

APPARATUS FOR WORKING ON METAL CONTAINERS

CROSS REFERENCE TO RELATED APPLICATIONS

This application is the National Stage of PCT/IT2007/000746 filed on Oct. 25, 2007. The international application under PCT article 21(2) was published in English.

TECHNICAL FIELD

The present invention relates to an apparatus for working on metal containers.

More in particular, the present invention relates to an apparatus for working on metal containers to be used especially in high speed machines that operate in continuous and intended for performing a sequence of operations on the side surface of the metal containers themselves.

BACKGROUND ART

Metal containers subject to mechanical processes on said machines basically are those obtained in aluminum, alloys thereof, steel or other suitable materials with which containers for the beverage, food field or technical use are obtained; such metal containers, before being subject to the multiple operations in a sequence that modify the outer side surface thereof, can be subject to preliminary inner and/or outer coating and lithography of the outer side surface.

The metal containers processed on such types of machines preferably are subject to different types of processes by plastic deformation called "necking" or "tapering", that is, processes that partially change the geometry of the container and the processes by plastic deformation called "shaping" which, on the other hand, globally change the geometry. The same metal containers can be subject to mechanical processes that consist in making recessed or projecting shaped impressions on predetermined portions of the side surface of the containers themselves; said last processes are generally referred to with the term "embossing/debossing".

As known, in machines that operate at high speed and in continuous, in order to carry out the sequence of mechanical processes mentioned above, it is necessary to move the metal containers from one working tower to the next one.

In said machines, the multiple working stations present wheels or "stars", suitable for receiving the metal containers for transferring and processing, whose outer crown is shaped with suitable pockets based on the diameter of the metal container to be processed; the transport of said metal containers from one working station to the next one takes place "at once", that is, using the vacuum technique and suitable mechanical guides intended for conveying the metal containers themselves.

A drawback of the conventional transport devices lies in the fact that they are unsuitable for moving complex shaped containers, such as those of the "bottle can" and/or "contour can" type, increasingly requested on the market. In fact, such types of containers present complex shaping of the side surface that requires a high number of passages and a reduced cylindrical portion for gripping. The high number of passages and thus, of transfers "worsens" the traditional method of pick up with vacuum technique, since the use of guides for the direct conveying of the metal conveyors causes scratching that, if repeated, can cause damages to the side surface of the containers themselves.

Moreover, the reduced cylindrical portion and the shape of the container makes the vacuum pick up, already "critical" for simple containers (of the "pop-can") difficult; the use of such technique implies a certain percentage of loss during the transfer from one working tower to the next one.

A further drawback is that the current transport devices present limits as regards the pick up strength that can be exerted on the containers and the movable mass.

A further drawback is that the traditional transport devices do not allow a high phase displacement between one working tower and the next one, without inducing faults and causing the reject of the container or the machine stoppage.

A further drawback is that such transport system is characterised by long tooling before operations on a container of different format can be carried out.

DISCLOSURE OF THE INVENTION

The object of the present invention is to obviate the drawbacks discussed hereinabove.

More in particular, the object of the present invention is to provide an apparatus for working on metal containers which should ensure steady and safe passage at high speed thereof, from one working tower to the next one, irrespective of the mass moved without directly acting on the side surface of the metal container.

A further object of the present invention is to provide an apparatus which during the transport of the metal containers from one working tower to the next one, should allow high phase displacement without any consequences on the process.

A further object of the present invention is to provide an apparatus easy to disassemble and maintain.

A further object is to provide a transport apparatus that Is able to manage different combinations of complexity of the product and productivity, allowing the metal container to undergo even multiple different processes on the same tower.

A further object of the present invention is to provide the users with a transport apparatus suitable for ensuring high level of resistance and reliability over time, also such as to be easily and inexpensively constructed.

This and other objects are achieved by the apparatus for working on metal containers of the present invention, which comprises a chain composed of a plurality of elements linked in a succession and cooperating in simultaneous transporting and processing of metal containers.

BRIEF DESCRIPTION OF DRAWINGS

The construction and functional features of the apparatus for working on metal containers of the present invention shall be better understood from the following detailed description, wherein reference is made to the annexed figures showing a preferred and non-limiting embodiment thereof, wherein.

BEST MODE FOR CARRYING OUT THE INVENTION

Figure 3:
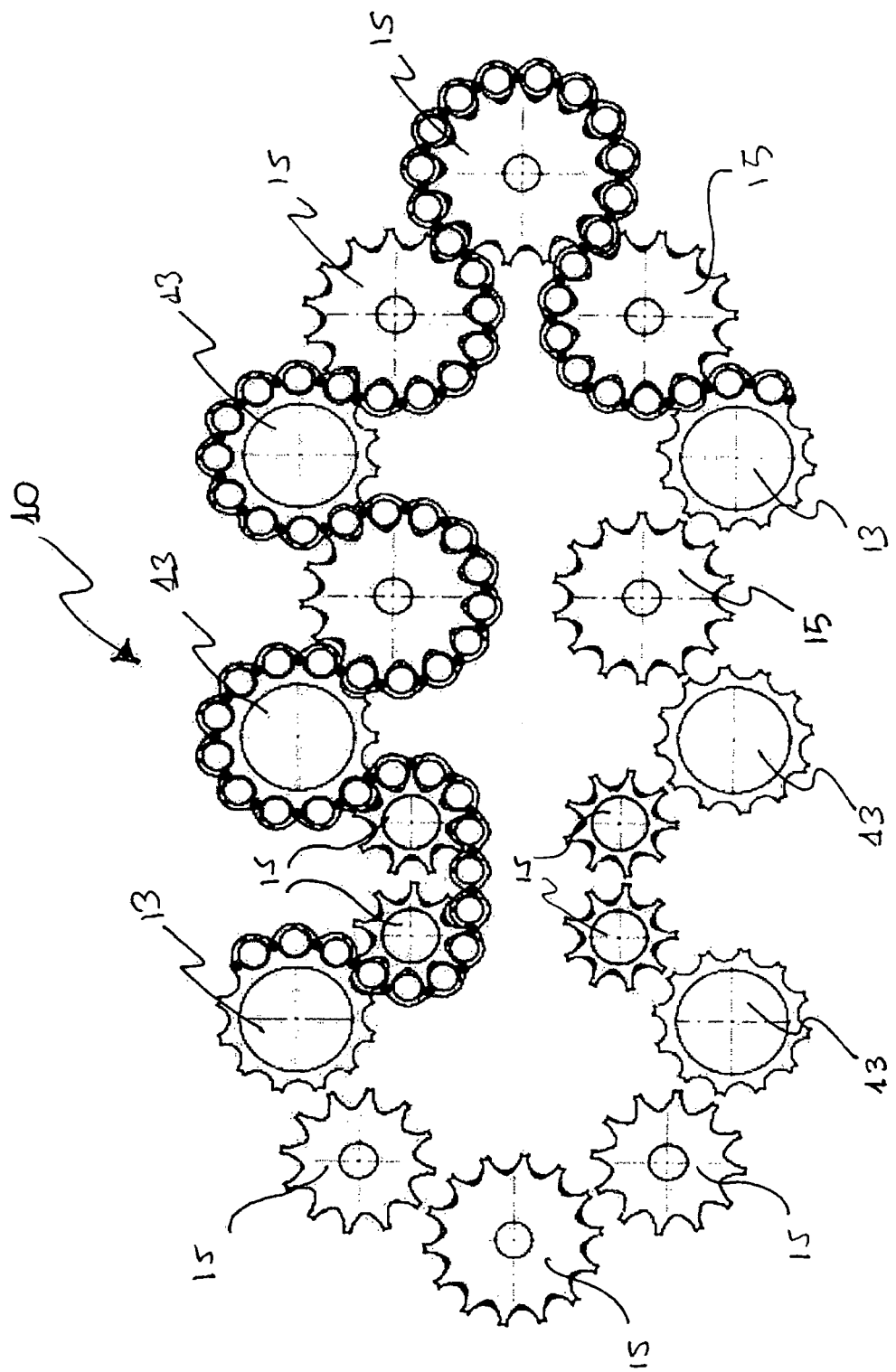
FIG. 3 shows a schematic view of a layout of the apparatus of the invention.

With reference to the above figures, the apparatus for working on metal containers of the present invention, globally indicated with 10 at FIG. 3, comprises a plurality of elements 12 shaped and connected to each other, according to the methods detailed hereinafter, for defining a closed chain and partially wound on multiple driving wheels 13 and idle or transfer wheels 15 of a high speed continuous machine not shown in the figures. The idle or transfer wheels 15 have the function of "routing" the chain composed of elements 12 according to a path defined depending on the design choices; some of the above idle wheels, moreover, define tighteners whose function is to keep the chain always tightened and compensate the irregularity thereof, due to dynamic strains, due to the polygonal effect of the chain. The driving wheels 13, on the other hand, are responsible for pulling the chain and are substantially at the machine working towers. In an alternative embodiment the chain is movable using a friction rail.

Both the driving wheels 13 and the idle wheels 15 preferably are of the toothed type so as to minimise the dynamic effects induced by the irregularity of the chain.

The elements 12, that compose the chain, are defined by a central element 12' of basically annular shape that on the side surface presents two opposite shaped link-expansions 14 and 14' suitable for allowing the connection of one element 12 with the next one.

With particular reference to the preferred embodiment of the figures, the opposite shaped link-expansions 14 and 14' of the elements 12 are respectively of male and female type and are provided with a through hole being directed rectangularly to the chain path, not indicated by a numerical reference in the figure, suitable for receiving the connecting or constraining means described hereinafter.

The male annular expansion 14, coaxially to the axial hole, seats at least one anti-friction element 17 for example defined by a bearing, preferably of the rolling type; the function of such anti-friction element is detailed hereinafter.

Figure 1:
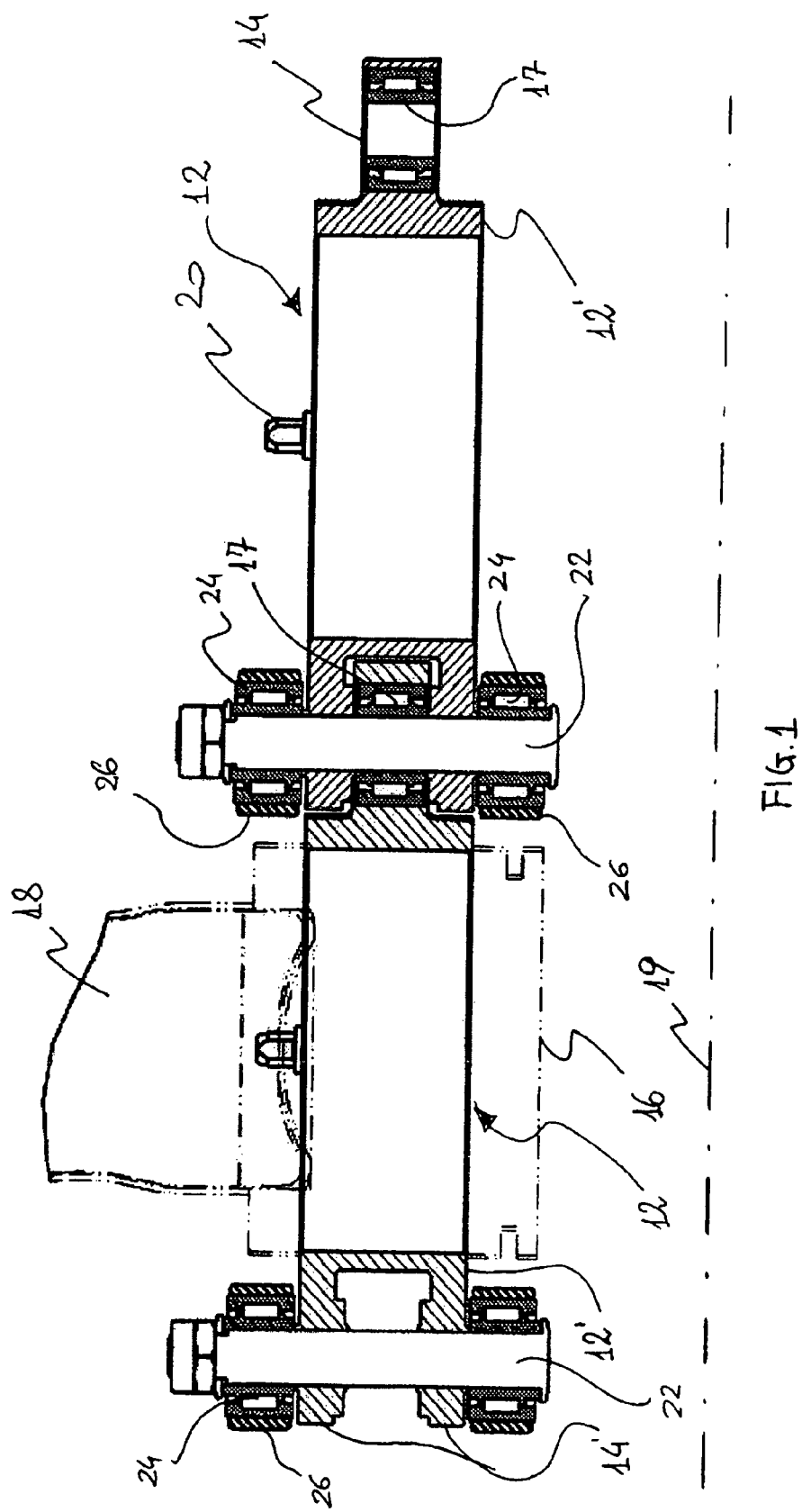
FIG. 1 schematically shows a longitudinal section view of a portion of the apparatus for working on metal containers of the present invention.
Figure 2:
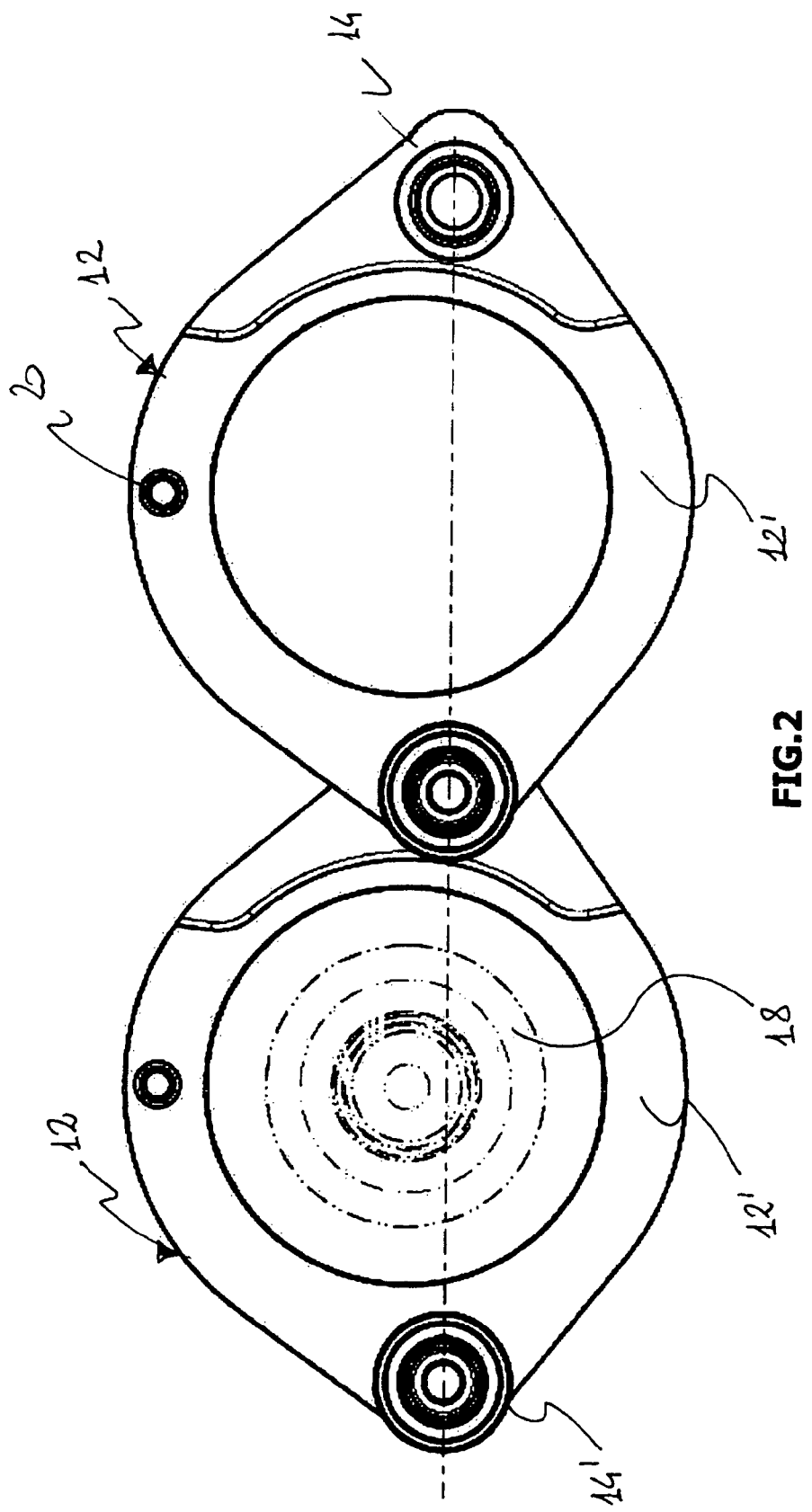
FIG. 2 shows a front schematic front view of a portion of the apparatus of the invention.

An interface element 16, indicated in FIG. 1 with a dashed line as it is not a part of the present invention and not an object of description, is seated coaxially to the single element 12 and internally to its central element 12', suitable for receiving a metal container 18 and for transporting it from a working tower to the next one of the machine for carrying out the deformation processes on the side surface of the metal container itself.

Each element 12 presents, preferably on the top front oriented to the bottom of the metal container 18, at least one optional angular reference element 20, for example defined by a projecting pin or a slot, with anti-rotation function towards the interface element 16 during the transfer from one working tower to the next one. Such optional angular reference element 20 is used in the case of processes, such as embossing/debossing processes, that require the rotation and keeping of the angular position.

During the transfer of the metal container 18 from one working tower to the next one, the part holder table 19 of each working station interfaces with the chain. The metal container inside the interface element 16, when at the processing tool, located on a tool-holder table (not, shown in the figure), by the effect of the thrust exerted by a pusher of the part-holder table 19, to which the interface element remains integral, exits from the element 12 and moves in contact with the processing tool (not shown in the figure). At the end of the process, the metal container 18 leaves the tool and reinserts into the chain at the same element 12 it had left.

In alternative embodiments the metal container 18 does not leave the element 12 during the processing step, but it is the tool of the part-holder table that with a translation motion approaches or retracts relative to the metal container, interfacing therewith for the process. In this embodiment, therefore, the chain never leaves the container and follows it in the processing step.

Each male shaped expansion 14 of an element 12 inserts in the corresponding female shaped expansion 14' of the next element 12. A pin 22, inserted in the through holes of the shaped expansions 14 and 14', defines a toroidal coupling or hinge between one element 12 and the next one, such as to allow the uninterrupted winding of the chain relative to the driving wheels 13 and to the idle wheels 15 of the machine.

With reference to FIG. 1, contact means with the driving wheels 13 and with the idle wheels 15 of the continuous machine are arranged coaxially to the pin 22 and externally thereto, at the top front and at the bottom front of the single element 12, on which the chain winds. Said contact means are defined by at least one further anti-friction element 24, for example consisting of at least one bearing of the rolling type arranged coaxially to the pin 22 and by an optional damping element 26, for example defined by one or more bushes of polymeric, metal or otherwise suitable material, arranged coaxially and preferably externally to the further anti-friction element 24. Said contact means are arranged beside the flanks of the central element 12' and the pin 22 has a length of at least the thickness of the two contact means in addition to the thickness of the central element and is locked at both ends.

The further anti-friction elements 24 have the function, together with the anti-friction elements 17, of minimising the loss of mechanical power caused by the frictions and eliminate the need of a frequent lubrication of the chain, due to a potential contamination of the processed metal containers.

The optional damping elements 26 have the function of defining a support interface of the chain of element 12 relative to the continuous transport and transfer elements of the machine, that is, the driving wheels 13 and the idle wheels 15.

In fact, during the movement of the chain of element 12, which takes place at a high speed, the damping elements 26 come in contact with the transfer elements from one working station to the next one of the continuous machine; such contacts, which occur with a collision, are a generating source of noise and vibration potentially dangerous if prolonged over time.

In an alternative embodiment, said optional damping element 26 is arranged internally to the further anti-friction element 24.

In a further alternative embodiment, the optional damping element 26 is arranged on the driving wheels 13 and on the idle wheels 15 at the contact zone with the element 12 of the chain.

The use of such damping elements 26, therefore, allows damping the contact between the chain and the transfer elements, reducing the extent of the collisions and therefore reducing, the noise and the vibrations induced by the collisions themselves.

As can be noticed from the above, the advantages achieved by the invention are clear.

The apparatus for working on metal containers of the present invention provides a transport system suitable for ensuring steady and safe passage of the metal containers, in particular of the bottle-can or contour-can type, from one working tower to the next one, irrespective of the mass moved.

A further advantage is the elimination of the percentage of loss and scratching during the transfer of the metal containers themselves.

A further advantage is the fact that the chain of elements 12 manages the transport of the metal containers and cooperates, simultaneously, with the processing of the same, does not affect the "fine" or accurate positioning of the metal container on the working tower and thus the accuracy and/or the quality of processing of the same is enhanced.

A further advantage of the invention is the fact that said apparatus allows the transport of the metal containers also with high angular phase displacements, between two contiguous working towers, without causing damages to the container or machine stoppage.

A further advantage of the apparatus of the invention is the fact that besides the transport of metal containers it also has the advantage of cooperating as power transmission means.

A further advantage of the apparatus of the invention is the fact that the same apparatus is easy to disassemble/assemble, flexible and re-configurable depending on the number and on the arrangement of the continuous machine wheels, and moreover, it is easy and convenient to maintain.

A further advantage is the fact that the chain of bodies, as described above, allows containing the mass and the inertia moment, allowing the operation thereof at a high speed even with unfavourable pitch-chain/no. of wheel teeth ratio; this along with the fact that the driving wheels and the idle wheels can be suitably arranged, optimises the dynamic behaviour and ensures longer useful life of the apparatus itself.

A further advantage is the fact that the closed structure of the chain of the apparatus of the invention along with the number of meshes of the same in relation to the number of stations of the single working tower, easily allows the repositioning of the metal container on each working tower, allowing the modulation of the number of operations required by the complexity of the metal container itself.

Even if the invention has been described hereinbefore with particular reference to an embodiment thereof made by way of a non-limiting example only, several changes and variations will appear clearly to a man skilled in the art in the light of the above description. The present invention therefore is intended to include any changes and variations thereof falling within the scope of the following claims.

The invention claimed is:

1. An apparatus (10) for working on metal containers especially suited for high speed machines intended for performing a sequence of operations on the metal containers, said apparatus comprising a chain including a plurality of successively linked elements (12) cooperating in simultaneously transporting and processing the metal containers wherein each element (12) includes an annular central element (12') suitable for receiving an interface element (16) that receives a metal container (18), said central element (12') having oppositely disposed a male shaped link expansion (14) and a female shaped link (14'), said shaped link expansions having a toroidal type coupling and having a through hole orthogonal to the chain path, said male shaped link expansion (14) being annular and including at least one anti-friction element (17) coaxial to said through hole of said male shaped link expansion (14).

2. The apparatus according to claim 1, wherein the toroidal coupling between the contiguous elements (12) comprises a pin (22) inserted coaxially to the through holes of the opposite shaped link expansions (14, 14') of the element (12).

3. The apparatus according to claim 2, which comprises contact means with driving wheels (13) and with idle wheels (15) of the high speed machine arranged at the ends of the pin (22) and at the top front and bottom front of each linked element (12).

4. The apparatus according to claim 3, wherein the contact means are arranged beside the flanks of the central element (12')and the pin has a length of at least the thickness of the two contact means in addition to the thickness of the central element and is locked at both ends.

5. The apparatus according to claim 4, wherein the contact means with the driving wheels (13) and with the idle wheels (15) of the high speed machine comprise:
- at least one anti-friction element (24) arranged coaxially to the pin (22); and/or
- a damping element (26) arranged coaxially to the anti-friction element (24).

6. The apparatus according to claim 5, wherein the anti-friction element (24) comprises at least one roller bearing.

7. The apparatus according to claim 5, wherein the damping element (26) is arranged externally to the anti-friction element (24).

8. The apparatus according to claim 5, wherein the damping element (26) is arranged internally to the anti-friction element (24).

9. The apparatus according to claim 5, wherein the damping element (26) is arranged on the driving wheels (13) and/or on the idle wheels (15).

10. The apparatus according to claim 5, wherein at least one angular reference element (20) is present on the surface of the central element (12') of the element (12).

11. The apparatus according to claim 10, wherein the idle wheels (15) include tighteners suitable for keeping the chain always tightened and for compensating the irregularity thereof.

* * * * *